Sept. 14, 1926.　　　　　　　　　　　　　　　　　1,600,135
J. PHILLIPS
AGRICULTURAL IMPLEMENT
Filed April 5, 1926　　　3 Sheets-Sheet 1

INVENTOR.
Jonathan Phillips,
BY
Geo. P. Kimmel
ATTORNEY.

Sept. 14, 1926.
J. PHILLIPS
AGRICULTURAL IMPLEMENT
Filed April 5, 1926
1,600,135
3 Sheets—Sheet 2
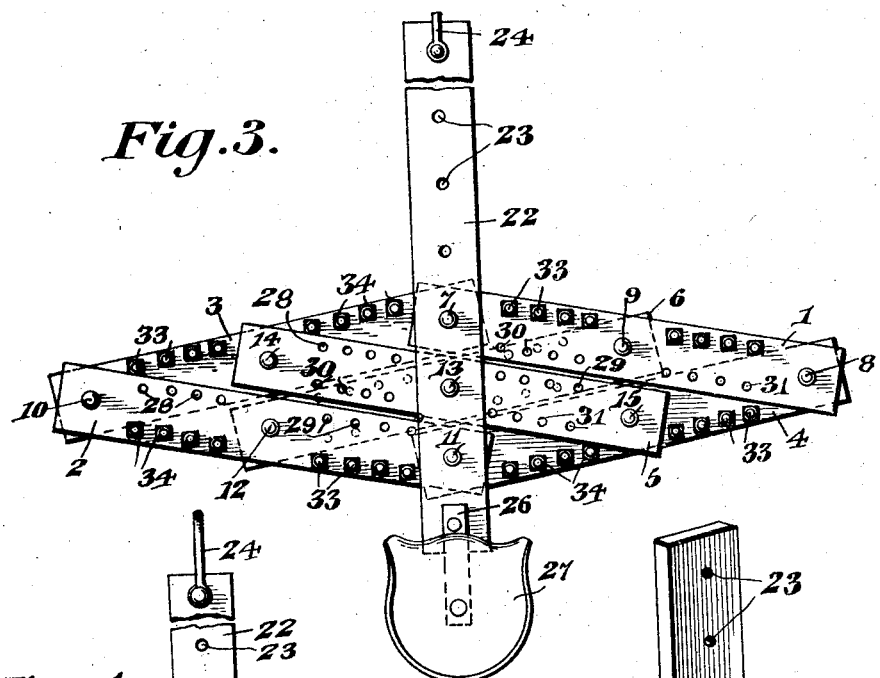
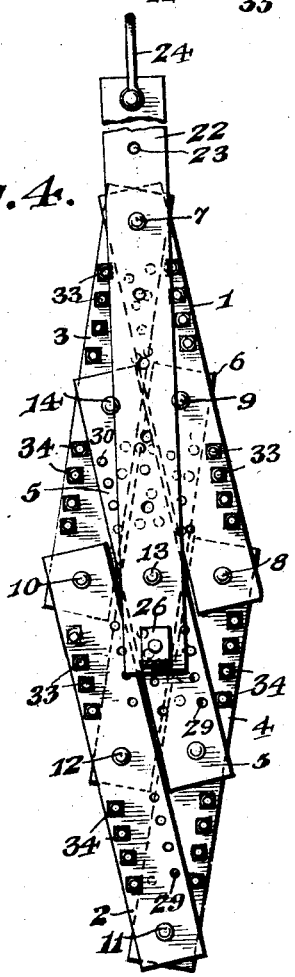
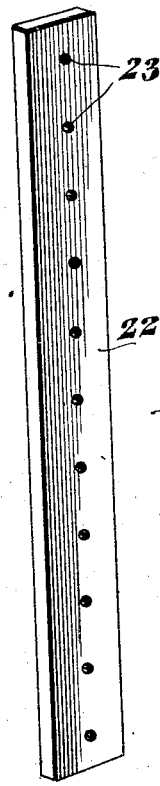
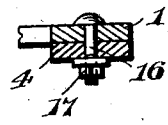
Fig. 3.
Fig. 4.
Fig. 6.
Fig. 7.
INVENTOR.
Jonathan Phillips,
BY
Geo. S. Kimmel
ATTORNEY.

Sept. 14, 1926. 1,600,135
J. PHILLIPS
AGRICULTURAL IMPLEMENT
Filed April 5, 1926 3 Sheets-Sheet 3

INVENTOR.
Jonathan Phillips,
BY
Geo. F. Kimmel ATTORNEY.

Patented Sept. 14, 1926.

1,600,135

UNITED STATES PATENT OFFICE.

JONATHAN PHILLIPS, OF ST. JOSEPH, MISSOURI.

AGRICULTURAL IMPLEMENT.

Application filed April 5, 1926. Serial No. 99,876.

This invention relates to an agricultural implement of the drag type, and has for its object to provide, in a manner as hereinafter set forth, a simple, inexpensive and efficient agricultural implement of great strength and durability, capable of being adjusted to increase or decrease the width or length thereof to perform the desired amount of work at the desired point.

Further objects of the invention are to provide, in a manner as hereinafter set forth, an agricultural implement for harrowing, cultivating, dragging down a series of listed corn ranges at one time, harrowing a series of rows of corn simultaneously, breaking stalks or weeds, cutting corn or stalks, leveling and pulverizing the ground, capable of having its teeth or knives expeditiously connected thereto and disconnected therefrom, rigidly maintained in adjusted position, capable of passing between trees and narrow spaces, readily assembled and disassembled when desired, and capable of being arranged compactly for shipping.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figures 2, 3 and 4 are views similar to Figure 1 in several adjusted positions.

Figure 6 is a perspective view of the draft bar.

Figure 7 is a fragmentary view in section, illustrating the pivot connection between certain of the frame members.

Figure 1:
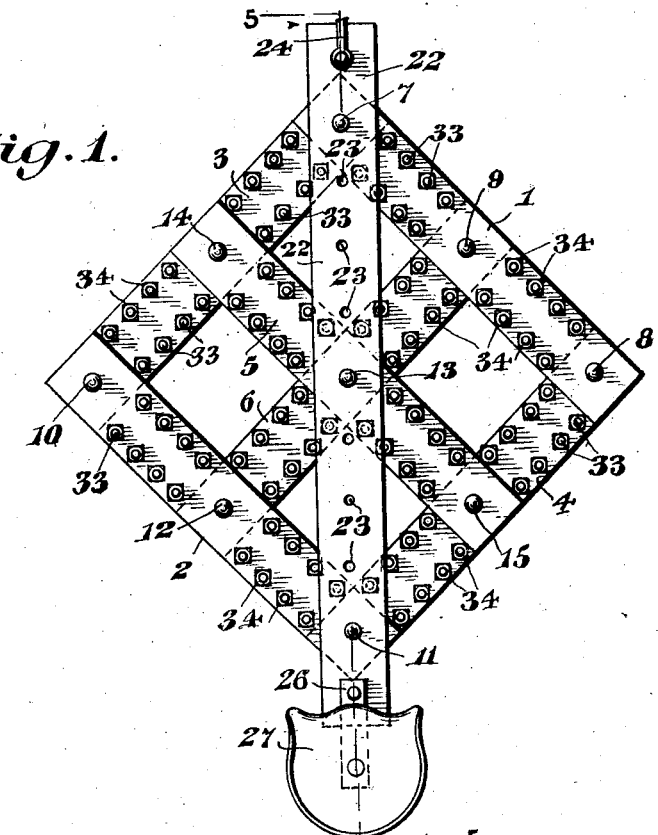
Figure 1 is a top plan view of an agricultural implements in accordance with this invention and in normal position.

An agricultural implement, in accordance with this invention, comprises an adjustable drag frame, which when in normal position, is in the form of a parallelogram. The frame consists of six frame members 1, 2, 3, 4, 5 and 6 which are pivotally connected together whereby the frame can be adjusted to decrease the width and increase the length thereof when desired. Each of the frame members consists of a flat bar of appropriate length, width and thickness.

The frame members 1 and 2 oppose each other. The frame members 3 and 4 oppose each other and are mounted against the lower face of the frame members 1 and 2. The frame member 5 extends from the frame member 3 to the frame member 4 and is mounted on the frame members 3 and 4 and also mounted on the frame member 6, and the latter extends from the frame member 1 to the frame member 2 and is positioned against the lower face of the said frame members 1 and 2.

One end of the frame member 1 is pivotally connected to one end of the frame member 3 as at 7, and the other end of the frame member 1 is pivotally connected to one end of the frame member 4 as at 8. The frame member 1 centrally thereof is pivotally connected to one end of the frame member 6 as at 9. The frame member 2 has one end thereof pivotally connected, as at 10, to the other end of the frame member 3 and the other end of the frame member 2 is pivotally connected as at 11 to the other end of the frame member 4. The frame member 2 centrally thereof is pivotally connected to the other end of the frame member 6. The frame members 5 and 6 are pivotally connected at their center, as at 13, and one end of the frame member 5 is pivotally connected as at 14 to the center of the frame member 3 and the other end of the frame member 5 is pivotally connected, as at 15, to the center of the frame member 4.

Figure 2:
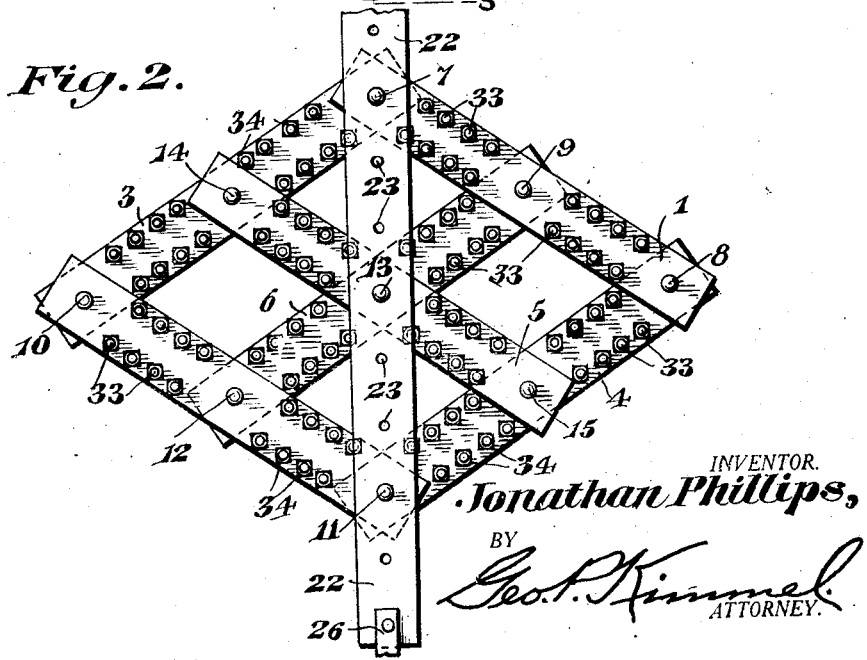

Each of the pivot connections 8, 9, 10, 12, 14 and 15 between the frame members consists of a headed bolt 16 and a clamping nut 17, as shown in Figure 7. Each of the pivot connections 7, 11 and 13 between the frame members consists of a headed bolt 18, a spacing collar 19 mounted thereon and a clamping nut 20, as shown in Figure 2. The bolts 18 are of greater height than the bolts 16 for a purpose to be presently referred to. Mounted on each of the nuts 17 and 20 is a washer 21.

The bolts 18 not only provide means for pivotally connecting the frame members 5 and 6 at the centers thereof, as well as pivotally connecting the frame member 1 to the frame member 3 and the frame member 2 to the frame member 4, but further provide means for fixedly securing a drag bar 22 to the frame for the purpose of maintaining it in adjusted position. The drag bar 22 is of appropriate length, width and thickness and is of greater length than any one of the frame members. The drag bar 22 at the longitudinal median thereof is formed with a lengthwise extending row of spaced openings 23 and the forward opening of said row is adapted to have a clevis 24 connected therewith to provide means for coupling the drag bar to a dragging or pulling means therefor. The openings 23 of the row selectively receive two or three of the bolts 18. When the frame is in the position as shown in Figures 1, 2 and 3 the drag bar 22 is connected therewith by three bolts 18, but when the frame is in the position as shown in Figure 4 two of the bolts 18 connect the drag bar to the frame. When the frame is in the position as shown in Figures 1, 2 and 3 the drag bar projects forwardly and rearwardly thereof, but when in the position shown in Figure 4 the drag bar projects but forwardly thereof. The openings 23 provide means for adjustably connecting the drag bar 22 to the frame. The rear opening 23 is employed for connecting to the rear end of the drag bar, by the securing device 25, a seat bracket 26, provided at its upper end with a seat 27.

When the drag bar 22 is connected to the frame for the purpose of maintaining it in set position, it is spaced from the frame members by the collars 19, as these latter are interposed between the drag bar 22 and the frame members 1, 2 and 5 when the frame is in the position shown in Figures 1, 2 and 3 and between the frame members 1 and 5 when the frame is in the position as shown in Figure 4.

Each frame member in proximity to each side edge thereof is formed with two spaced sets of spaced openings. Each set is positioned between and spaced from a pair of pivotal connections for a frame member. One set of openings is indicated at 28, another set at 29, another set at 30 and the other set at 31. See Figure 3. The openings of the sets are provided for the passage of the shanks of harrow teeth, cutting teeth and cultivator blades. When the frame member is in the position shown in Figure 2 each frame member has connected therewith four sets of harrow teeth, or cutting teeth or cultivator blades, but when the frame is in the position as shown in Figures 3 and 4 the frame members 1, 2, 3 and 4 are provided only with two sets of teeth and the frame members 5 and 6 are not provided with any teeth.

Figure 5:
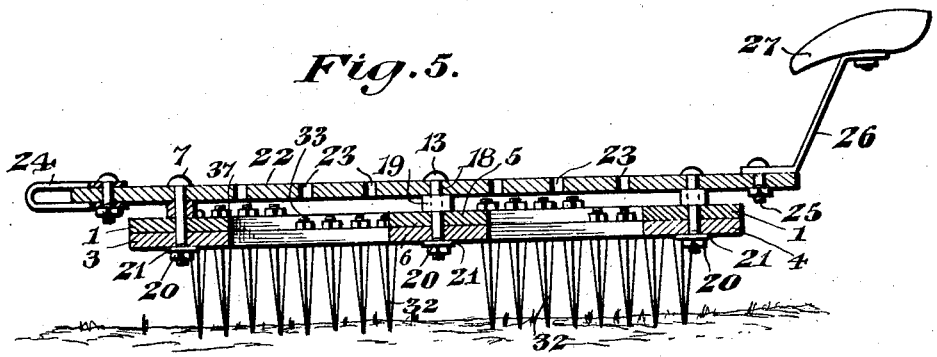
Figure 5 is a section on line 5—5, Figure 1.

In Figure 5 of the drawings the frame members are illustrated as provided with sets of harrow teeth and each of the latter consists of a polygonal shaped tapered body portion 32 having its larger end formed with a reduced shank 33, which extends through an opening in the frame member and carries on its upper end a clamping nut 34 which threadedly engages with the shank.

It is thought that the many advantages of an agricultural implement, in accordance with this invention, can be readily understood, particularly in view of the fact that the function derived therefrom is as hereinbefore set forth, and although the preferred embodiment of the invention is as illustrated and described, yet it is to be understood that changes in the details of construction can be had which will fall within the scope of the invention as claimed.

What I claim is:—

1. An agricultural implement comprising an adjustable frame for carrying ground working devices, said frame of the drag type and formed of two pair of opposed frame members and a pair of oppositely extending frame elements crossing each other at the centers thereof, means for pivotally connecting the ends of the said two pair of opposed frame members together, means for pivotally connecting said elements together at the centers thereof, means for pivotally connecting the ends of one of said elements to one pair of opposed members at the centers thereof, means for pivotally connecting the ends of the other of said elements to the other pair of opposed members at the centers thereof, said members and elements having openings for connecting ground working devices therewith, and a drag bar mounted on said frame and detachably connected therewith by certain of said means, and maintaining the frame in adjusted position.

2. An agricultural implement comprising an adjustable frame for carrying ground working devices, said frame of the drag type and formed of two pair of opposed frame members and a pair of oppositely extending frame elements crossing each other at the centers thereof, means for pivotally connecting the ends of the said two pair of opposed frame members together, means for pivotally connecting said elements together at the centers thereof, means for pivotally connecting the ends of one of said elements to one pair of opposed members at the centers thereof, means for pivotally connecting the ends of the other of said elements to the other pair of opposed members at the centers thereof, said members and elements having openings for connecting ground working devices therewith, a drag bar mounted on said frame and detachably connected therewith by certain of said means, and maintaining the frame in adjusted position, and said bar provided with means for adjustably positioning it relative to the frame.

In testimony whereof, I affix my signature hereto.

JONATHAN PHILLIPS.